No. 765,624. PATENTED JULY 19, 1904.
D. W. LEONARD.
TILTING ATTACHMENT FOR VEHICLE TOPS.
APPLICATION FILED OCT. 29, 1903.
NO MODEL. 2 SHEETS—SHEET 1.

WITNESSES:
INVENTOR
Daniel W. Leonard
BY
ATTORNEYS

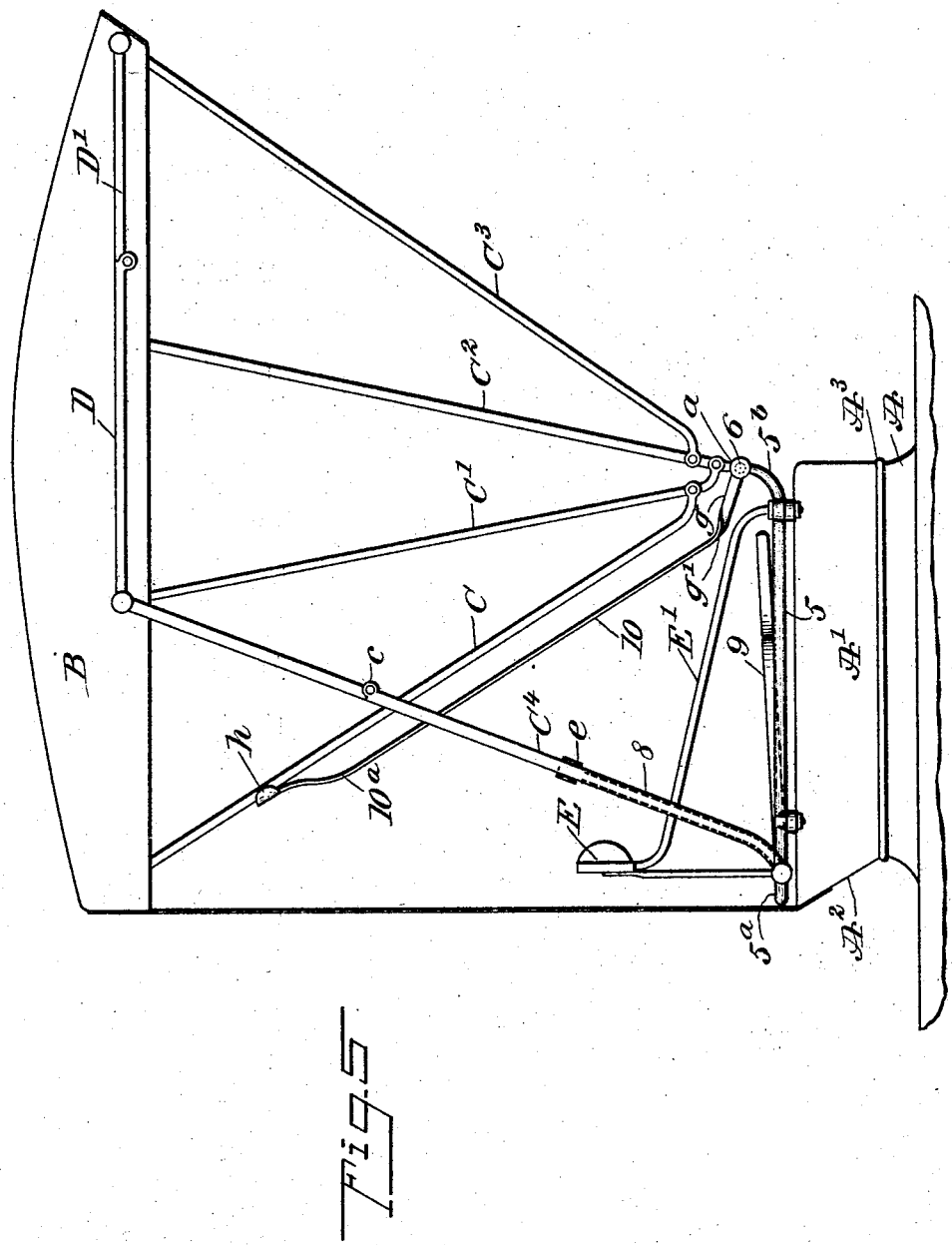

No. 765,624. Patented July 19, 1904.

UNITED STATES PATENT OFFICE.

DANIEL W. LEONARD, OF NEAR HURN, WASHINGTON, ASSIGNOR OF ONE-HALF TO AUSTIN ZENKNER, OF CENTRALIA, WASHINGTON.

TILTING ATTACHMENT FOR VEHICLE-TOPS.

SPECIFICATION forming part of Letters Patent No. 765,624, dated July 19, 1904.

Application filed October 29, 1903. Serial No. 178,967. (No model.)

*To all whom it may concern:*

Be it known that I, DANIEL WEBSTER LEONARD, a citizen of the United States, residing near Hurn, in the county of Lewis and State of Washington, have invented a new and Improved Tilting Attachment for the Tops of Vehicles, of which the following is a full, clear, and exact description.

The object of this invention is to provide a novel simple attachment for the foldable tops of vehicles that may be readily applied thereto and which affords convenient and reliable means for instantly raising or lowering the foldable top and when the top is quickly lowered cushions its descent so as to prevent jar and injury to the prop-braces, bows, or other parts of the top.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1:
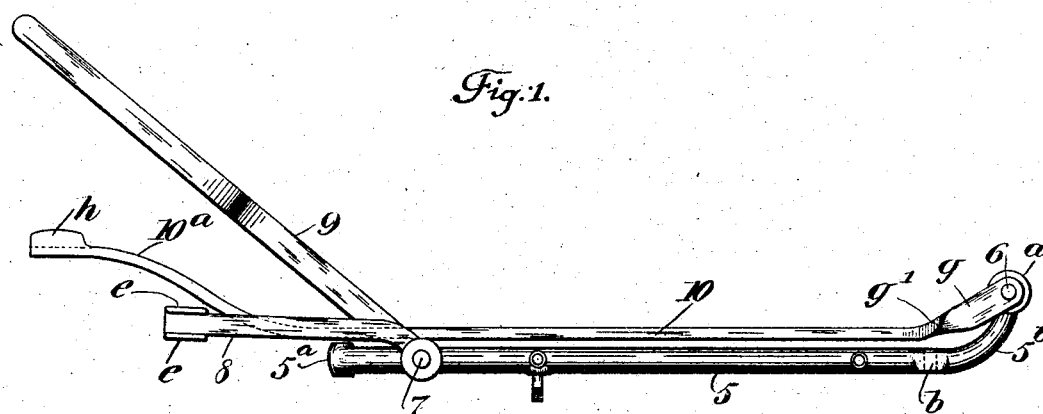
Figure 2:
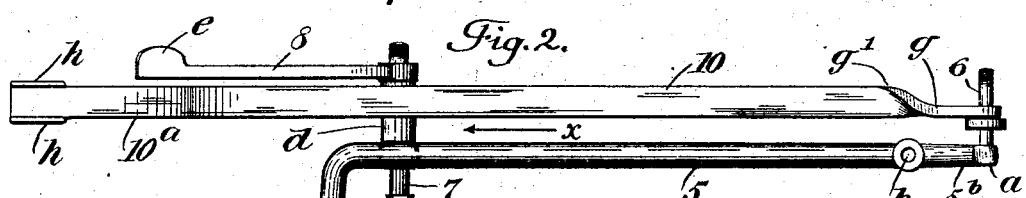
Figure 3:
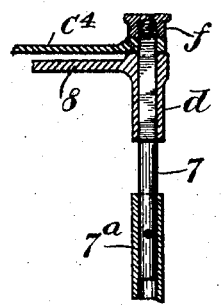
Figure 4:
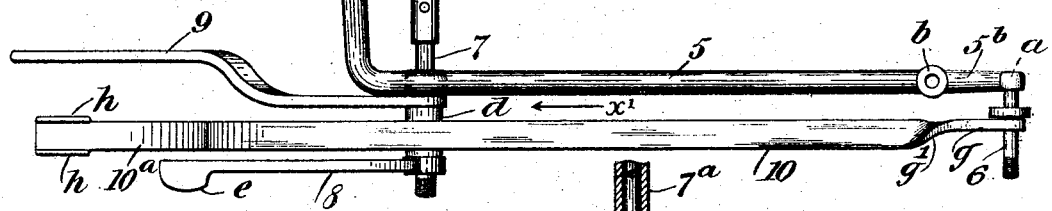
Figure 4:
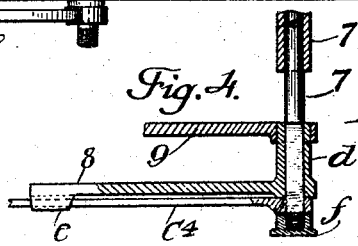

Figure 1 is a side view of the invention, showing parts folded. Fig. 2 is a plan view of the same. Fig. 3 is a sectional plan view of details of the invention, the position of which is indicated by the arrow $x$ in Fig. 2. Fig. 4 is a like view of details at the opposite side of the vehicle seen opposite the arrow $x'$ in Fig. 1, and Fig. 5 is a side view of a vehicle seat and top and of the improvement mounted thereon.

In the drawings that illustrate the construction and application of the invention, A represents a vehicle-seat of ordinary box style, having opposite sides A' and a back board $A^2$ erected on the side and rear edges of the seat-board $A^3$ for the retention of a seat-cushion, as usual, one side piece appearing in Fig. 5. Upon the upper edges of the cushion-guard walls A' $A^2$ a metal top rail is mounted and secured that is formed with two side members 5 5, which are spaced apart parallel with each other by the back rail member $5^a$, as is shown in Fig. 2.

At the front ends of the rail members 5 two similar arms $5^b$ are formed by curving the material upwardly, these arms terminating at their upper ends in laterally-flattened bosses $a$, from which outwardly and oppositely project the pivot-studs 6. Near the arms $5^b$ vertical perforations $b$ are formed in the members 5 of the top rail, and like vertical perforations $b$ are formed in the transverse member $5^a$ at suitable points, these perforations in the top rail affording means for attaching a seat-back E and its supporting-arms E' upon the top rail of the seat.

The folding top for the vehicle, as represented in Fig. 5, comprises as supports for the flexible covering B the bows C C' $C^2$ $C^3$, that have the usual upright limbs formed integrally on arched portions thereof, the limbs on one side of the vehicle appearing in Fig. 5. As is common in the construction of folding tops for vehicles, two of the bow members (indicated by the characters C' $C^3$) are pivoted one above the other on the bow $C^2$, and the latter is loosely mounted upon the pivot-stud 6 at the corresponding side of the vehicle, and it is understood that the said bows at the opposite side of the vehicle are in a like manner lapped and pivoted together for their support upon the remaining pivot-stud 6, whereon they are held by any suitable means.

The lower ends of the bow members C, one at each side of the vehicle, are bent toward and lapped upon the respectively adjacent limbs C' and pivoted thereto. At the upper portions of the side members or limbs of the bows C' $C^3$ the ordinary braces D D', that are pivoted together, have their outer ends jointed thereon to hold the top erect, but permit the bows to fold toward each other when the vehicle-top is to be lowered rearwardly. The prop-braces $C^4$, one for each side of the vehicle-top, respectively, consist of two members that are jointed together, as at $c$ in Fig. 5, and the upper end of each prop-brace is pivoted upon the rear end of the rear brace D, and, as indicated in Fig. 5, for one prop-brace, the lower end thereof being held to rock upon a projection at the side of the rail member 5, which will be described.

The description that has been given may apply to the foldable tops for light vehicles of various styles, it being a necessary preliminary to enable a clear understanding of the construction and relative disposal of details of the improvement, which are connected therewith as will appear in the subjoined description of the invention.

In the side members 5 of the top rail for the vehicle-seat two lateral perforations are formed oppositely and near the back member 5ª of said top rail. In the perforations mentioned two similar journaled stub ends 7 of a rock-shaft are loosely inserted, so as to project at each side of each member 5. The portions of the stub ends 7 that project toward each other are slid into corresponding open ends of the hollow shaft-body 7ª and are therein secured by rivets, thus disposing the completed rock-shaft transversely of the top rail and projecting beyond each side thereof for the reception of other parts of the device and to which the lower ends of the prop-braces C⁴ are pivoted. While the shaft 7 7ª may be formed with a tubular body and with journal ends that are solid, as shown, it is to be understood that the transverse rock-shaft complete may be formed of a metal rod.

A tilting-arm 8 is mounted upon each end portion 7 of the rock-shaft 7ª at the inner side of a respective prop-brace C⁴, and each tilting-arm may have a hollow hub $d$ formed or secured thereon to facilitate the proper fixture of said arms upon the shaft ends 7, whereon the hubs are mounted and secured by any preferred means. The tilting-arms are of an equal length, and at the outer end of each arm two clasping-flanges $e$ are formed, that are projected outwardly from the edges of the arm, and the flanges $e$ on each tilting-arm receive between them the edges of an adjacent prop-brace C⁴. The stub ends 7 of the shaft 7ª are furnished with nuts $f$, that engage the threaded ends thereof and when screwed against the proper braces C⁴ prevent their outward movement on the rock-shaft.

Upon the hub $d$ on one tilting-arm 8, preferably at the right side of the vehicle-seat, one end of a lever 9 is affixed or, if preferred, the lever may be secured by said end upon the stub end 7 of the rock-shaft that the lever is to rock, as may be required, and it will be seen that when the lever inclines forwardly, as represented in Fig. 5, the bows and the prop-braces C⁴ will be rocked into an erect position and the bows will be disposed fan-like to distend the cover of the top. It will also be noticed that as the tilting-arms have clamped engagement at their outer ends with the prop-braces at the lower members of the same the rearward rocking movement of the lever 9 will correspondingly rock all the bows rearward, owing to the clasped engagement of the arms 8 with the prop-braces C⁴, and cause the top to fold rearwardly, thus removing it from above the seat of the vehicle.

There are two buffer-arms 10, provided to cushion the rearward and downward movement of the folding top, and, as shown, each buffer-arm consists of an elongated thin bar of resilient metal that is provided at the forward end with a vertically-disposed ear $g$, formed by twisting the material, as indicated at $g'$ in Figs. 1 and 2, these ears $g$, that are transversely perforated, being respectively mounted upon one of the pivot-studs 6 and thereon held by any suitable means. The flat bodies of the buffer-arms 10 extend rearward above the hubs $d$ of the tilting-arms 8 and may rest thereon, having clearance from the members 5 of the top rail and also from the tilting-arm on one side of the vehicle and the lever 9 at the opposite side of the same. The portions 10ª of the buffer-arms 10 that extend rearward of the hubs $d$ are curved so as to elevate their rear ends, as indicated in Figs. 1 and 5, and on these rear ends similar flanges $h$ are formed at the side edges. The buffer-arms 10 are in the path of the limbs of the bows, and the flanges $h$ will clasp the edges of the rear bow C and hold the arms secured thereto.

It will be seen that when the lever 9 is quickly rocked rearward and the vehicle-top is thrown rapidly into folded condition the rearward falling movement of the top will be cushioned by the rear ends of the resilient buffer-arms, so that no injury will result and the jar of impact will be absorbed, thus preventing improper wear and breakage of the bows and braces that connect them.

It will be apparent that the clasped engagement of the tilting-arms 10 with the side members of the back bow C will stiffen said members and prevent undue wear at the pivot connections of the back bow with the rock-shaft. Furthermore, the buffer-arms 10 prevent a side rattling movement of the back bow where they engage it, and thus coact with the tilting-arms 9 to keep the top from swaying sidewise when in folded condition, which is injurious and quickly loosens the pivot-joints of the bows as such parts are ordinarily constructed and connected with a vehicle.

As the lever 9 is very conveniently positioned, the occupant of a vehicle having the improvement can control the movement of the lever while seated in the vehicle, and if it becomes necessary for the safety of one or more persons to be permitted to leave the vehicle at its sides the folding top if in elevated condition may be instantly thrown down, so as to be out of the way, by an upward rocking movement of the lever 9.

Having thus described my invention, I claim as new and desire to secure by Letters Patent—

1. The combination with a vehicle-seat and a foldable top thereon, of a rock-shaft supported transversely on the seat, duplicate tilting-arms having lateral hubs respectively secured on the rock-shaft near its ends, said arms having clasping-flanges on their side edges at the outer ends, two jointed prop-bars having a lower member of each prop-bar held to rock on a respective end of the rock-shaft outside of the tilting-arm thereon, said prop-bar members being clasped by the spaced flanges on the tilting-arms, and a lever secured upon the hub of one tilting-arm and thus adapted by rocking movement to raise or lower the foldable top.

2. The combination with a vehicle-seat, a top rail on the top edges of said seat extending to the front of its sides, and a foldable top held to rock on the front ends of the top rail, of a rock-shaft journaled in the side members of the top rail near their rear ends, and extended laterally therefrom, duplicate tilting-arms having hollow hubs that are secured on the end portions of the rock-shaft outside of the top rail, two jointed prop-bars for the foldable top having the lower members thereof mounted to rock on the ends of the rock-shaft outside of the tilting-arms, said arms having spaced flanges on their outer ends that clasp the lower members of the prop-bars, and a lever secured on the hub of one tilting-arm near a side member of the top rail.

3. The combination with a vehicle-seat, a top rail thereon having arms at the front ends of its side members, pivot-studs projected laterally from the free ends of said arms, and a foldable top having a plurality of bows and top-prop braces, certain of which are pivoted on the pivot-studs, of a rock-shaft having extensions passing through opposite perforations in the top rail member, two tilting-arms secured on the extensions and clasping the lower members of the prop-braces, a lever secured by one end upon one of said extensions, and two resilient buffer-arms held by one end of each on a respective pivot-stud at the front of the top rail, said arms extending rearward to rest on the hubs of the tilting-arms, and curving upward at their rear ends, for the support of the back bow of the top of the vehicle.

4. The combination with a vehicle-seat and a foldable top thereon, of two resilient buffer-arms held at their forward ends on projections from the seat and extending rearward at the sides of said seat, the rear ends of said buffer-arms being adapted to cushion the descent of the vehicle-top when it is folded.

In testimony whereof I have signed my name to this specification in the presence of two subscribing witnesses.

DANIEL W. LEONARD.

Witnesses:
GEO. C. ELLSBURY,
GEO. DYSART.